(12) United States Patent
Norbeck, Jr. et al.

(10) Patent No.: US 10,748,161 B1
(45) Date of Patent: Aug. 18, 2020

(54) SYSTEM AND METHOD FOR MANAGING COMPUTING RESOURCE ORDERS

(71) Applicant: VCE Company, LLC, Richardson, TX (US)

(72) Inventors: Donald Norbeck, Jr., Lafayette Hill, PA (US); Ryan J. Andersen, Belmont, MA (US); Kendrick A. Coleman, Louisville, KY (US); James A. Ellers, Portland, OR (US); Praphul Krottapalli, Cary, NC (US); Joshua L. Bonczkowski, Apex, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 462 days.

(21) Appl. No.: 14/588,021

(22) Filed: Dec. 31, 2014

(51) Int. Cl.
*G06Q 30/02* (2012.01)
*G06F 8/60* (2018.01)
*H04L 12/24* (2006.01)

(52) U.S. Cl.
CPC ........... *G06Q 30/0201* (2013.01); *G06F 8/60* (2013.01); *H04L 41/082* (2013.01)

(58) Field of Classification Search
None
See application file for complete search history.

(56) References Cited

U.S. PATENT DOCUMENTS

| | | | | |
|---|---|---|---|---|
| 2005/0071674 A1* | 3/2005 | Chou | ...................... | H04L 63/02 726/4 |
| 2012/0137278 A1* | 5/2012 | Draper | ...................... | G06F 8/65 717/170 |
| 2014/0279201 A1* | 9/2014 | Iyoob | ........................ | G06F 8/60 705/26.7 |
| 2015/0020059 A1* | 1/2015 | Davis | ........................ | G06F 8/60 717/171 |

OTHER PUBLICATIONS

Seungrahn Hahn et al., Capacity Planning for Business Intelligence Applications: Approaches and Methodologies, IBM, International Technical Support Organization, Nov. 2000 (Year: 2000).*

* cited by examiner

*Primary Examiner* — Ivan R Goldberg
*Assistant Examiner* — Matthew H Divelbiss
(74) *Attorney, Agent, or Firm* — Polsinelli PC

(57) ABSTRACT

A system for determining when to order computing resources includes one or more processors to receive a request to determine when to order computing resources for a computing environment, receive at least one report for the computing environment, the report detailing past usage of at least one object included in the computing environment over a period of time, compute future usage of the at least one object included in the computing environment based on estimated growth of utilization of the at least one object included in the computing environment using data in the at least one usage report, determine at least one recommended reorder point for an upgrade to the at least one object and at least one recommended upgrade for the computing environment based on the past usage, the future usage, and a time to complete and deploy the at least one recommended upgrade to the computing environment.

20 Claims, 8 Drawing Sheets

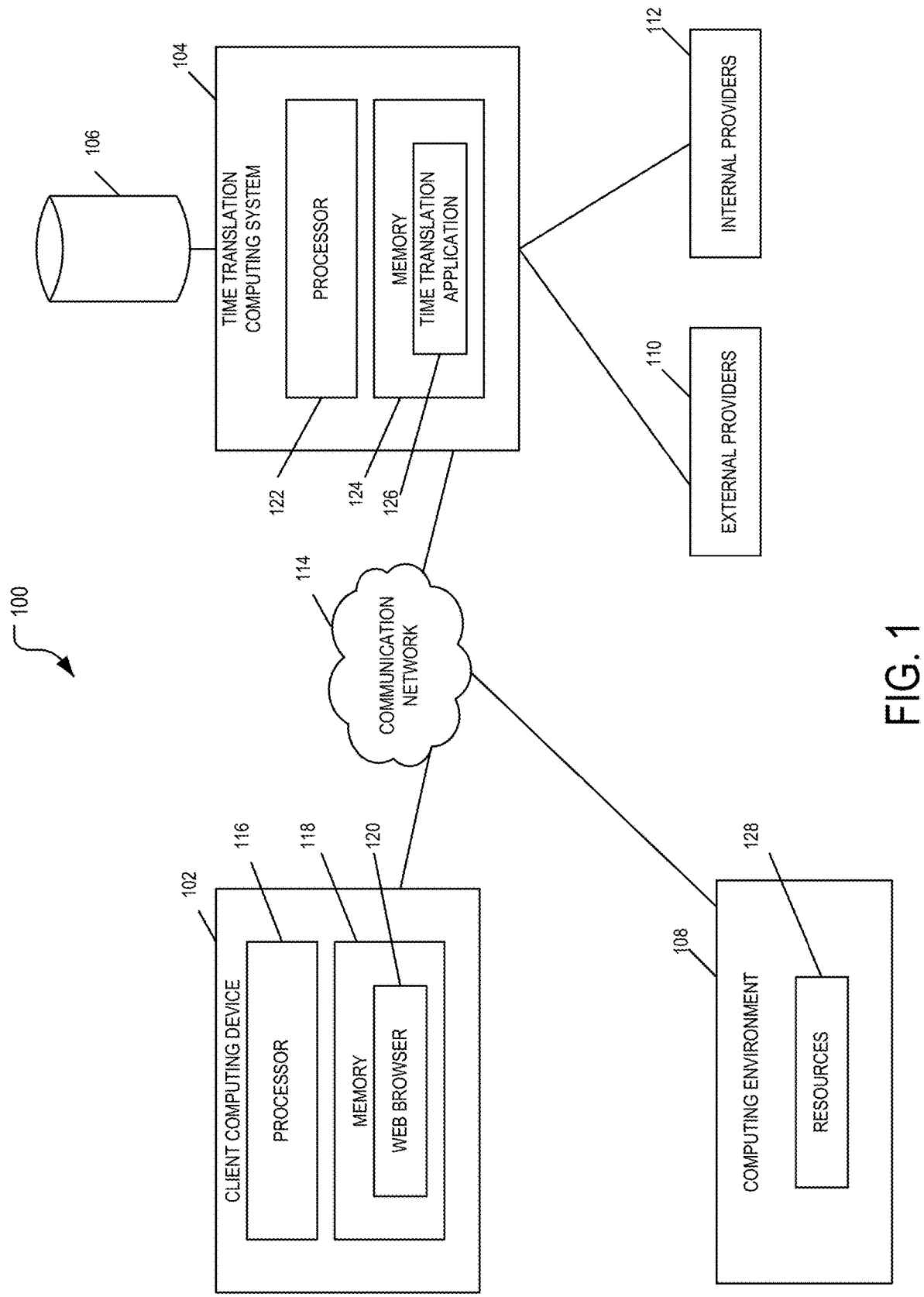

SYSTEM AND METHOD FOR MANAGING COMPUTING RESOURCE ORDERS

TECHNICAL FIELD

Aspects of the present disclosure relate to computing devices and, in particular, to a system and method for determining when to order upgrades, modifications, and/or additional computing resources.

BACKGROUND

Computing resources used by enterprises, such as corporations and universities, are often provided by multiple computing devices (e.g., hardware resources and software resources) that function in a collaborative manner to meet the computing resource needs of the enterprise. Over time, the computing resources may be consumed and additional resources may need to be purchased or otherwise may have to be upgraded. As an example, storage space within a storage device may be gradually consumed and additional physical disk drives may need to be added in order to provide the additional storage space that may be needed. While new and upgraded computing resources are easily obtainable, information technology (IT) representatives may not know what computing resources to order and/or when to order computing resources. The IT representatives associated with the enterprises tend to overpurchase computing resources. This leads to inefficiencies and results in unnecessary expenditures. In other cases, computing resources may be underpurchased and/or underpowered. Enterprises may not have the insight or data to make informed ordering decisions.

SUMMARY

According to one aspect of the present disclosure, a system for determining when to order computing resources aggregates data regarding computing resource consumption and determines when to order additional computing resources. The system determines upgrades to make to a computing environment, modifications to make to the computing environment, and/or additional computing resources to order for the computing environment based on available options. Additionally, the system determines when to order the additional computing resources based on current usage, projected usage, and a time to configure the upgrades, configure the modifications, and/or configure the additional computing resources.

According to one embodiment, the system includes one or more processors to receive a request to determine when to order computing resources for a computing environment, the request associated with a unique order identifier, receive at least one report for the computing environment, the report detailing past usage of at least one object included in the computing environment over a period of time, compute future usage of the at least one object included in the computing environment based on estimated growth of utilization of the at least one object included in the computing environment using data in the at least one usage report, determine at least one recommended reorder point for an upgrade to the at least one object included in the computing environment comprising a future date and at least one recommended upgrade for the computing environment based on the past usage, the future usage, and a time to complete and deploy the at least one recommended upgrade to the computing environment, generate a graphical user interface representation of the at least one recommended reorder point with respect to time indicating the future date and an amount of time until the future date, and generate a graphical user interface representation of the at least one recommended upgrade.

According to another embodiment, a method includes receiving, by at least one processor, a request to determine when to order computing resources for a computing environment, the request associated with a unique order identifier, receiving, by the at least one processor, at least one report for the computing environment, the report detailing past usage of at least one object included in the computing environment over a period of time, computing, by the at least one processor, future usage of the at least one object included in the computing environment based on estimated growth of utilization of the at least one object included in the computing environment using data in the at least one usage report, determining, by the at least one processor, at least one recommended reorder point for an upgrade to the at least one object included in the computing environment comprising a future date and at least one recommended upgrade for the computing environment based on the past usage, the future usage, and a time to complete and deploy the at least one recommended upgrade to the computing environment, generating, by the at least one processor, a graphical user interface representation of the at least one recommended reorder point with respect to time indicating the future date and an amount of time until the future date, and generating, by the at least one processor, a graphical user interface representation of the at least one recommended upgrade.

According to a further embodiment, a non-transitory computer-readable medium includes instructions stored thereon that, when executed by at least one processor, cause the at least one processor to perform operations including receiving a request to determine when to order computing resources for a computing environment, the request associated with a unique order identifier, receiving at least one report for the computing environment, the report detailing past usage of at least one object included in the computing environment over a period of time, computing future usage of the at least one object included in the computing environment based on estimated growth of utilization of the at least one object included in the computing environment using data in the at least one usage report, determining at least one recommended reorder point for an upgrade to the at least one object included in the computing environment comprising a future date and at least one recommended upgrade for the computing environment based on the past usage, the future usage, and a time to complete and deploy the at least one recommended upgrade to the computing environment, generating a graphical user interface representation of the at least one recommended reorder point with respect to time indicating the future date and an amount of time until the future date, and generating a graphical user interface representation of the at least one recommended upgrade.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

FIG. 1 illustrates an example system for determining when to order computing resources including a time translation computing system according to one embodiment of the present disclosure.

DETAILED DESCRIPTION

Figure 2A:
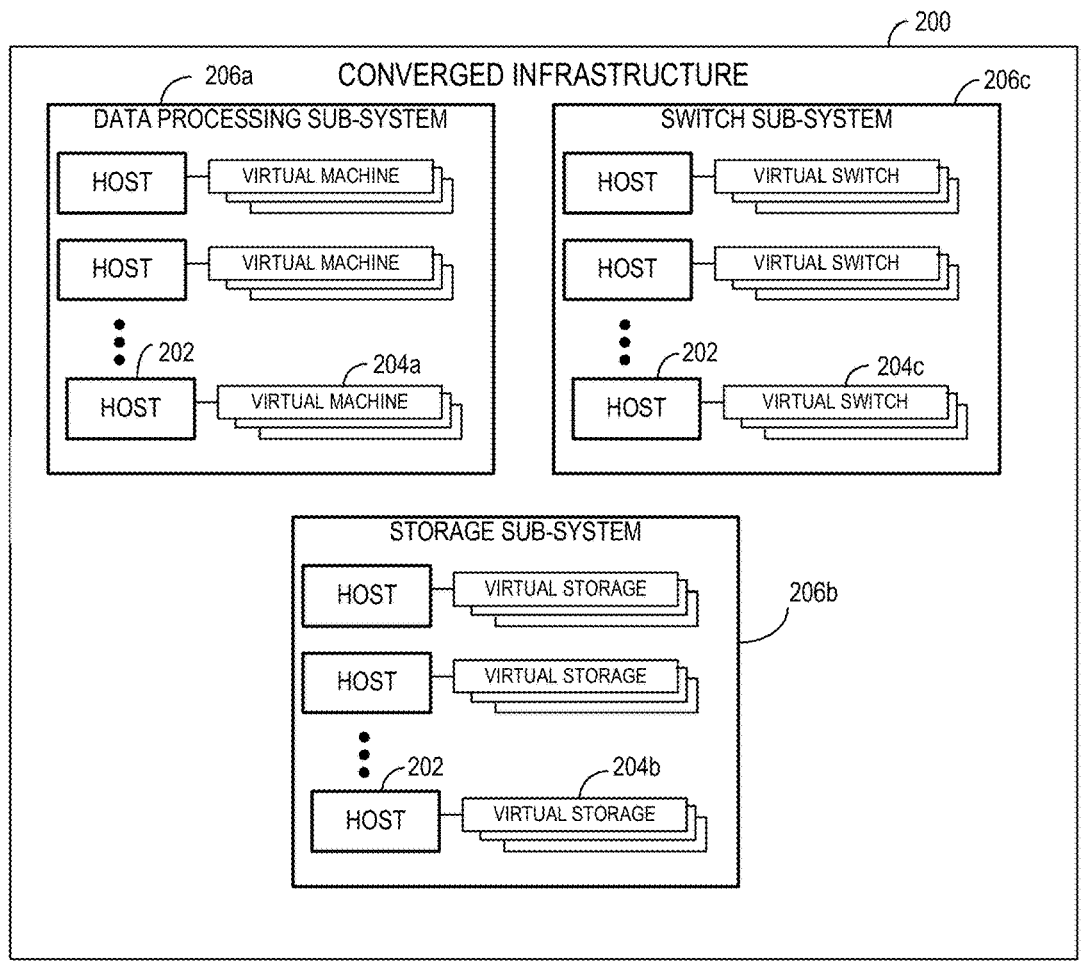
FIGS. 2A and 2B illustrate an example converged infrastructure that may be in communication with the system for determining when to order computing resources according to one embodiment of the present disclosure.

Embodiments of the present disclosure provide a system for determining when to order additional resources for a computing system including but not limited to storage arrays, compute servers, networking resources, related services such as firewalls and load balancers, and platform elements including hypervisors and virtualization management systems. The computing system may be a converged infrastructure (CI), and the resources may be included within a converged system and/or independent components. The system monitors the computing system, determines upgrades to make to the computing system, modifications to make to the computing system, and/or additional computing resources to order for the computing system based on available options. As an example, the computing system may be an email computing system for an enterprise and include a server, a networking device, a storage device, and one or more software applications, among other components. Each of these components may be replaced, upgraded, or even downgraded. As an example, the storage device may be nearing a capacity or a storage quota. The system determines when to order the additional computing resources based on current usage, projected usage, and a time to configure the additional computing resources. As an example, the system would determine when to order an upgraded storage device based on current usage of the storage device, projected usage of the storage device, and the time to configure the upgraded storage device in order to provision the upgraded storage device and make the upgraded storage device available for use and consumption.

The system may include a web server that utilizes a web application framework to support a dynamic website and/or a web application. The web server deploys and runs JavaServer Pages (JSP), Active Server Pages (ASP), ASP.NET pages, PHP pages, and/or other types of pages that include server-side and/or client-side scripts that interact with a user using a client computing device. The web server dynamically generates web pages for managing computing resource orders. A client computing device transmits a request to the web server that identifies computing resource orders. In turn, the web server transmits a response comprising the dynamically generated web pages for managing computing resource orders including recommended upgrades or modifications. A user of the client computing device may select the recommended upgrades or modifications to order and configure the additional computing resources.

This solution provides central information technology (IT) users with a way to ensure that just the right amount of infrastructure is purchased, provisioned, and made consumable just in time. Conventionally, central IT users overpurchased computing resources and/or underpurchased computing resources based on misinformation and/or a lack of information about resource capacities associated with infrastructure. Central IT users are unaware of current need associated with normal usage and may not know how long computing resources support normal course of usage. When computing resources are overpurchased, the resources may sit idle. When computing resources are underpurchased, the resources may be purchased too late and/or be overburdened resulting in a failure to meet a service level agreement (SLA) or worse.

An enterprise, such as a corporation, a professional organization, a government agency, a university, or a data center operator, may order any number of computing resources to fulfill some computing need such as running one or more software applications, hosting one or more websites, providing a network connection, and storing data, among others. The computing resources may be ordered and managed by an administrator, e.g., the central IT user. The central IT user may have the responsibility of enabling computing resources for consumption by business users, e.g., end consumers, employees of a company, students and faculty of a university, and application developers of the enterprise. The application developers may manage software applications for the enterprise. As an example, the central IT user may be responsible for supplying an email system and other productivity applications for a corporation of five hundred employees. The central IT user may have the ability to create, review, add, change, and delete objects, policies, and service offerings used to power the email system and the other productivity applications provided by the computing system. In the present example system, computing resources that are monitored, may be added or upgraded, or the like, are referred to as objects and managed in the system as objects.

The order may be for one or more objects comprising an atomic computing device, a converged computing device, and/or an abstracted computing device. As an example, an object may be a blade server, a storage array, a firewall, and/or a software application, among other objects. An object also may be an abstraction of a group of objects, e.g., a storage pool comprising a plurality of storage devices. An object model may include a description of interrelationships between objects. The object model may be used to define relationships between objects for a particular computing environment or computing resource, e.g., a computing environment includes object A, object B, and object C. Object A comprises objects D, E, and F. Object B comprises objects G, H, and I. As an example, Object C may not be built until object A is completed. Object C comprises objects J, K, and L.

The object model is used to standardize mapping of objects to component configurations. As an example, the object model may comply with or be based on Topology and Orchestration Specification for Cloud Applications (TOSCA). TOSCA enables interoperable descriptions of application and infrastructure cloud services, enables relationships between the parts of the services, and enables the operational behavior of the services including deploy, patch, and shutdown. The description is designed to be independent of any supplier providing the objects or services. In other words, the object model describes any number of possible computing resources as unique objects in a standardized way. A computing system being managed in accordance with the systems described herein may be described in a standardized way using the object model comprising any number of objects representative of the various resources forming the computing system.

The policies may be used to apply constraints to the computing system. The policies may be created or defined by the administrator or central IT user. As an example, there may be location based policies, availability based policies, compliance based policies, performance based policies, and other types of policies. There may be policies related to physically locating the hardware in a particular location in the world, e.g., US East, US West, EU, Asia Pacific, South America. There may be policies related to availability of the computing system, e.g., 99.999% or five nines, 99.99% or four nines, 99.9% or three nines, and 99% or two nines. There may be policies related to specific types of compliance, e.g., PCI (Payment Card Industry Data Security Standard), PII (Personally identifiable information), HIPAA (Health Insurance Portability and Accountability Act). There may be policies related to performance of the computing system including high performance, mid-range performance, and economy performance. In addition, there may be other policies related to computing systems having specific features including flash storage or VMWare NSX™.

In many instances, an upgrade, modification, and/or order for additional computing resources takes a significant amount of time to fulfill or complete. Generally, a time frame is unknown. In the past, an order process may have taken six months, a year, eighteen months, or even longer to complete. Conventionally, the central IT user may have placed the order for additional computing resources based on a utilization percentage or a resource threshold percentage. The central IT user placed the order at this arbitrary time to account for the unknown time frame, and provide enough time to account for architecture, purchase, receipt, build, provisioning, and related actions associated with making raw computing resources including servers, storage arrays, and networking equipment available as additional computing resources for consumption. As an example, at an arbitrary 75% of utilization of compute, network, storage, and/or virtualization resources, the central IT user may have placed the order. However, this may be too late, or too early, or may fail to consider numerous factors, resulting in overprovisioning or underprovisioning resources and leading to inefficiencies. Instead, using a system conforming to aspects of the present disclosure, rather than placing the order when the resource threshold reaches the arbitrary 75% of utilization of compute, network, storage, and/or virtualization resources, the system considers numerous factors including current and projected usage in addition to a time to complete tasks associated with architecting, ordering, purchasing, receiving, building, and provisioning the computing resources and making the computing resources available for consumption as expansion to the existing computing environment or a new computing environment. Using a system that conforms to aspects of the disclosure allows the central IT user to place the order for additional resources at a specific time that is based on a time it takes to order, provision, and make the additional resources available for consumption based on current usage and projected usage. This may reduce underutilization and/or overutilization of computing resources and help reduce unnecessary expenditures for enterprises.

In many instances, when the central IT user completes an upgrade build, an expansion build, or a new computing environment build, the central IT user may not have a way to project how long the computing resources satisfy demands of users and workload applications. Conventionally, the central IT user may have placed an order for additional computing resources based on a presumption of appropriateness of resources for particular demands of users and workload applications. The central IT user may have desired that the computing resources of the order satisfy consumption demands for a particular period of time and may have ordered the computing resources based on budget constraints that may be associated with a yearly budget. As an example, the central IT user may have an annual budgeting cycle having a particular budget that may be dedicated toward IT resources for the enterprise. This particular budget is expected to cover IT needs for the enterprise for a year. Conventionally, the central IT user purchased computing resources up to a limit of the particular budget based on an incomplete understanding of capacity of computing resources, demand of users of the enterprise, demand of applications used by the enterprise, and an amount of time it may take to make the computing resources available for consumption. As a result, the central IT user may purchase too many computing resources, too few computing resources, or may fail to consider numerous factors. This results in overprovisioning or underprovisioning computing resources and may lead to inefficiencies. Using a system conforming to aspects of this disclosure allows the central IT user to place an order for additional computing resources at a specific time based on a time it takes to order, provision, and make the additional computing resources available for consumption based on current usage and projected usage. The central IT user may select how long the purchase satisfies consumption patterns under a normal course of business for the enterprise. This may reduce underutilization and/or overutilization of computing resources and help reduce unnecessary expenditures for the enterprise.

FIG. 1 illustrates an example system for determining when to order computing resources 100 including a time translation computing system 104 according to teachings of the present disclosure. The time translation computing system 104 translates utilization of computing resources into units of time to determine when to order upgrades, modifications, and/or additional computing resources. The system for determining when to order computing resources 100 may be a component provided by a cloud management and brokerage portal. The portal provides a central IT user with recommendations to order and manage computing infrastructure. The recommendations to order and manage computing infrastructure are based on the object model that defines the computing resources, a policy engine that enforces rules of consumption, configuration, and provisioning of the computing resources, and a state engine that applies policies to the computing resources when they are in use. The translation of utilization of computing resources into units of time is based on the object model, the policy engine, and the state engine.

According to an aspect of the present disclosure, the system 100 includes a client computing device 102 and the time translation computing system 104 that provides recommendations for ordering and managing computing infrastructure of a computing environment 108. The system 100 further comprises a data source 106 that may be one or more databases comprising an organized collection of data for the system for determining when to order computing resources 100. The one or more databases may store data in one or more tables and be managed by a database management system (DBMS) including a relational DBMS, and other types of DBMSs.

The data source 106 stores one or more order summary files including order summary information, computing environment current usage and utilization information, computing environment projected usage and utilization information, time translation information that includes reorder points, and recommended upgrade, modification, and additional computing resource information that are used by the time translation computing system 104. When the central IT user places an original order for the computing environment 108, an order summary file or another data structure may be created and stored in the data source 106 including a list of one or more computing components of the computing environment 108. The original order may be assigned a unique order identifier for referencing the one or more computing components of the computing environment 108. The order summary file may be modified when changes, modifications, or upgrades are made to the computing environment 108.

Nevertheless, the data source 106 may store any suitable type of information for translating current utilization into a reorder point for the computing environment 108. Although the data source 106 is shown as being located on, at, or within the time translation computing system 104, it is contemplated that the data source 106 can be located remotely from the time translation computing system 104, such as on, at, or within a memory of a host or virtual object of the computing environment 108.

The time translation computing system 104 monitors current usage of the computing environment 108 and may receive usage information indicating usage of the computing environment 108 using VCE VISION™, CISCO® Unified Computing Server (UCS) Manager, or another software analytics package. VCE VISION™ is a software application executed by the computing environment 108 or another computing device that provides a continuous, real-time perspective of compute, network, storage, and virtualization resources of the computing environment 108. UCS Manager provides unified, embedded management of software and hardware components of the computing environment 108 and may manage resources for a plurality of computing devices of the computing environment 108 including virtual machines. As an example, the UCS Manager determines current processor utilization for one or more blade servers of the computing environment 108. The current usage of the computing environment 108 may be displayed by a user interface and retrieved using an API call. The current usage may be limited to an individual component, e.g., one server, or may represent the current usage of a plurality of components of the computing environment 108.

The time translation computing system 104 includes a time translation application 126. The time translation application 126 communicates with external providers 110 and internal providers 112 to establish a list of available computing components and/or modifications to upgrade the computing environment 108 based on the usage information. The external providers 110 may provide information from external sources related to consumption patterns and/or details on capacities associated with computing resources and the internal providers 112 may provide private cloud computing offerings and other computing service offerings. The central IT user may manage the public cloud computing offerings, the private cloud computing offerings, and the other computing service offerings comprising the computing environment 108 for the enterprise and the employees of the enterprise. As an example, the time translation application 126 may send application program interface (API) calls to the external providers 110 and the internal providers 112. The API calls may include authentication information that provides authentication information identifying the central IT user or enterprise. As an example, the time translation application 126 may send an API call to CISCO's Online Ordering Tool that identifies the enterprise and makes a query to the data source 106 to determine capacities of the computing environment 108. The data source 106 may store authentication information for sending API calls to the external providers 110 and/or the internal providers 112 (e.g., unique identifiers or keys), may store a list of one or more objects associated with the computing environment 108, and may store a list of available computing components and/or modifications available for upgrading the computing environment 108 that are selectable and configurable using the portal.

The client computing device 102 and the time translation computing system 104 communicate with one another using a communications network 114. Nevertheless, the client computing device 102 and the time translation computing system 104 may communicate with one another in any suitable manner. For example, the client computing device 102 and time translation computing system 104 communicate with each other using wireless, wired, and/or optical communications. In one specific embodiment, the client computing device 102 and the time translation computing system 104 communicate with one another using the communication network 114, such as the Internet, an intranet, or other wired and/or wireless communication networks. In another embodiment, the client computing device 102 and the time translation computing system 104 communicate using any suitable protocol or messaging scheme.

As an example, the client computing system 102 and the time translation computing system 104 communicate data in packets, messages, or other communications using a common protocol, e.g., Hypertext Transfer Protocol (HTTP) and/or Hypertext Transfer Protocol Secure (HTTPS). The computing devices of the system 100 may communicate based on representational state transfer (REST) and/or Simple Object Access Protocol (SOAP). As an example, a first computer (e.g., the client computing device 102) may send a request message that is a REST and/or a SOAP request formatted using Javascript Object Notation (JSON) and/or Extensible Markup Language (XML). In response to the request message, a second computer (e.g., the time translation computing system 104) may transmit a REST and/or SOAP response formatted using JSON and/or XML. The systems may communicate without the use of a separate or a distinct network. Embodiments contemplate that the modules employed by the time translation application 126 are executed by a computing device, discussed below.

In one example, the client computing device 102 transmits a request comprising a plan capacity request for the computing environment 108 to the time translation application 126 of the time translation computing system 104. The plan capacity request is a request for planning for future upgrades, modifications, and/or changes to the computing environment. The time translation application 126 of the time translation computing system 104 receives the plan capacity request from the client computing device 102. The request may include a unique order identifier that corresponds with the computing environment 108. The time translation application 126 receives usage data for the computing environment 108, and stores the usage data for the computing environment 108 in the data source 106.

The time translation application 126 determines a current usage of the computing environment 108, projects future usage of the computing environment 108 based on the current usage and the past usage based on a change in utilization over a period of time, determines available computing resources for upgrading the computing environment 108, determines an amount of time to provision the available computing resources, and provides one or more recommended reorder points and recommended upgrades, modifications, and/or additional computing resources for the computing environment 108. When the computing environment 108 consumes all available resources, the computing environment 108 may hit a point known as total consumption of resources. When total consumption of resources occurs, the computing environment 108 may experience slowdowns and/or service disruptions. The recommended upgrades, modifications, and/or additional computing resources may include a list of one or more recommended upgrades, modifications, and/or additional computing resources to avoid the total consumption of resources. The recommended reorder point may be a specific date, a specific time, a range of time and/or dates, or may be based on other attributes such as when some other event occurs.

As an example, the computing environment 108 may be the email system and comprise MICROSOFT™ Exchange servers comprising ten physical compute blades that support twenty virtual machines, 110 gigabytes (GB) of SAN (storage area network) based block storage, and consume 10 megabits (Mb) of network capacity at peak. As an example, the computing environment may be currently running at 50% of aggregate utilization across the computing resources, consuming 90% of the 110 GB of SAN based block storage, 5% of allocated physical servers, and 5% of 100 Mb of network capacity. Additionally, the computing environment 108 may be growing at 10% in capacity consumption per month based on user usage and enterprise growth. The time translation application 126 may transmit one or more API calls and receive computing environment configuration information from one or more computers and one or more databases provided by the external providers 110. As an example, the time translation application 126 may query the data source 106 using the unique order identifier for referencing the one or more computing components and obtain information about the current computing environment configuration from the external providers 110. The internal providers 112 may include ServiceNow™, a configuration management database (CMDB), VCE VISION™, and other computing resources. The time translation application 126 may transmit one or more API calls and receive computing environment configuration information from one or more computers and one or more databases provided by the internal providers 112. As an example, the time translation application 126 may query the data source 106 using the unique order identifier for referencing the one or more computing components and obtain information about the current computing environment configuration from the internal providers 112. The information from the external providers and the internal providers may be provided via one or more user interfaces.

As an example, using the client computing device 102 or another computing device, the central IT user may search for and select from one or more service offerings using the cloud management and brokerage portal comprising a graphical user interface (GUI) indicating the available service offerings. The service offerings comprise a collection of interrelated objects provided by the internal providers 112. As an example, a service may be a single object such as a component or a backup service that may be a consumable service that is spread across multiple data centers including storage, server, and networking objects. As an example, the SAN supporting the MICROSOFT Exchange servers may be nearly overutilized and additional storage capacity may be needed. The MICROSOFT Exchange workload of the computing environment 108 may be consuming 100 GB of the 110 GB availability associated with the SAN block storage. Additional storage array capacity may be recommended to support the growth of the computing environment 108.

In one example, the time translation application 126 determines whether the one or more objects for upgrading or modifying the computing environment are in stock or available at the internal providers 112 by sending the API calls. The objects may include storage components, server components, networking components, converged components, and abstracted components. The central IT user may select and order recommended upgrades for the computing environment 108 from the one or more service offerings. The central IT user may select an infrastructure as a service to support an upgrade of an email system. Thus, in one example, the computing environment 108 comprising the email system may be managed and upgraded by adding increased server capacity for additional business users.

The time translation application 126 may be one or more servlets and one or more JSP files that perform functions on behalf of requests by the client computing device 102. The time translation application 126 determines whether the one or more objects are in stock or available for order by requesting information from the external providers 110 and the internal providers 112 via the API calls. The time translation application 126 receives at least one usage report for the computing environment 108, the usage report detailing usage of at least one object included in the computing environment 108, determines past usage of the at least one object included in the computing environment 108, and projects future usage of the at least one object included in the computing environment based on estimated growth of utilization of the at least one object included in the computing environment 108. The time translation application 126 also determines at least one recommended reorder point for an upgrade to the at least one object included in the computing environment 108 and at least one recommended upgrade, modification, and/or additional computing resource for the at least one object included in the computing environment 108 based on the past usage, current usage, and the future usage, and transmits a representation of the at least one recommended reorder point and the at least one recommended upgrade, modification, and/or additional computing resource to the client computing device 102. As an example, the time translation application 126 executes one or more JSP files and delivers an HTML document including the representation to the client computing device 102.

The client computing device 102 may be a computer having one or more processors 116 and memory 118, including but not limited to a server, laptop, desktop, tablet computer, smartphone, or a dedicated electronic device having a processor and memory. The one or more processors 116 may process machine/computer-readable executable instructions and data, and the memory 118 may store machine/computer-readable executable instructions and data including one or more applications, including a web browser 120. The processor 116 and memory 118 are hardware. The memory 118 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The web browser 120 may be a component of an application and/or service executable by the client computing device 102. For example, the web browser 120 may be a single unit of deployable executable code. The web browser 120 may be one application and/or a suite of applications. As an example, the web browser 120 may be INTERNET EXPLORER®, SAFARI®, CHROME™, FIREFOX®, OPERA™, and other applications. The web browser 120 may be part of another native application executed by the client computing device 102 (e.g., a web view within the native application) and/or the web browser 120 may be a mobile web browser. According to an example embodiment, the web view may be embedded in a mobile application (e.g., an app) downloaded from a digital distribution application platform that allows users to browse and download applications developed with mobile software development kits (SDKs) including the App Store and GOOGLE PLAY® among others. The app may be installed on the client computing device 102, which may have an iOS operating system or an ANDROID™ operating system, among other operating systems. The web browser 120 communicates messages to the time translation computing system 104 and receives messages from the time translation computing system 104, e.g., HTTP requests and corresponding HTTP responses. The responses may comprise requested content, including information associated with the computing environment 108.

The client computing device 102 may further include an optional display and an input device. The display is used to display visual components of the web browser 120, such as at a user interface. In one example, the user interface may display a user interface of the web browser 120. The display can be a liquid-crystal display, a light-emitting diode display, an organic light-emitting diode display, a touch screen display, an e-ink display, an e-paper display, and other displays. The input device is used to interact with the web browser 120 and may include a mouse, a keyboard, a trackpad, and/or the like. The input device may be included within the display if the display is a touch screen display. The input device allows a user of the client computing device 102 to manipulate and interact with the user interface of the web browser 120.

The time translation computing system 104 may be a computer having one or more processors 122 and memory 124, including but not limited to a server, laptop, desktop, tablet computer, smartphone, or a dedicated electronic device having a processor and memory. The one or more processors 122 may process machine/computer-readable executable instructions and data, and the memory 124 may store machine/computer-readable executable instructions and data including one or more applications, including the time translation application 126. The time translation application 126 may be a web application. In addition, time translation application 126 may provide an application program interface (API) so that other software tools can consume derived information for other purposes, such as providing reorder point information and recommended additional computing resources for the computing environment 108. The processor 122 and memory 124 are hardware.

The memory 124 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like.

The computing environment 108 may be provided in whole or in part through a converged infrastructure. The computing environment 108 is monitored by the time translation application 126 of the time translation computing system 104. In a specific example of a computing environment 108 that includes a converged infrastructure (CI), the resources 128 may include hardware resources (e.g., hosts 206) and/or virtual resources (e.g., virtual machines 208*a*, virtual switches 208*b*, and/or virtual storage objects 208*c*) executed by the hosts 206 of the converged infrastructure (See FIG. 2). In this case, the CI may include thousands of physical objects that each executes tens or even hundreds of virtual objects.

The resources 128 of the computing environment 108 may represent hardware resources and/or one or more virtual objects executed on those hardware resources, which may be implemented in a virtual computing environment. The virtual computing environment may be embodied in any computing system that provides virtualized components (virtual objects) executed on one or more physical hosts. Converged infrastructures typically refer to computing systems implemented in a virtual computing environment that includes a structured combination of multiple virtual objects that are executed on independently functioning hardware resources commonly referred to as hosts. Converged infrastructures implemented in a virtual computing environment may be advantageous in that they are dynamically configurable to continually adapt to ever changing requirements typically exhibited by modern converged infrastructures. Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can be shared by multiple applications.

In another aspect, a converged infrastructure comprises a combination of converged infrastructures configured in a cloud computing environment. While some examples disclosed herein reference converged infrastructures, also sometimes referred to as unified computing systems, fabric-based computing systems, and dynamic infrastructures, systems and method described herein may be applied to other computing environments 108.

Resources 128 of a converged infrastructure may include resources, such as data processing devices, data storage devices, servers, networking equipment, and/or other computing devices. A converged infrastructure includes a combination of these devices that are packaged and interconnected in a standardized manner for ease of maintenance and use. For example, a converged infrastructure 200 such as that shown in FIG. 2 includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing environment, such as a computer cluster, computing grid, blade array, and/or other computing infrastructure may be upgraded using the teachings of the present disclosure.

FIG. 2A illustrates an example converged infrastructure 200 that may be implemented as the computing environment 108 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is located in Palo Alto, Calif.

Figure 2B:
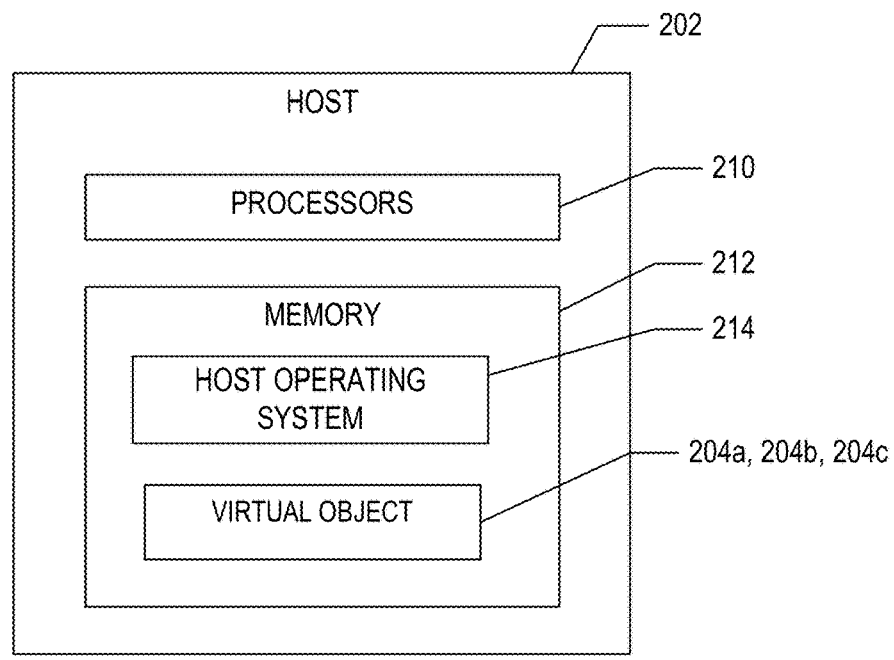

FIG. 2B illustrates an example host 202 implemented on each converged infrastructure 200 according to one aspect of the system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as a blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 214 controls and manages the operation of the virtual objects executed on the host 202. For example, control signaling for starting, stopping, and/or changing operating parameters of each virtual object is managed through the host operating system 214.

Figure 3:
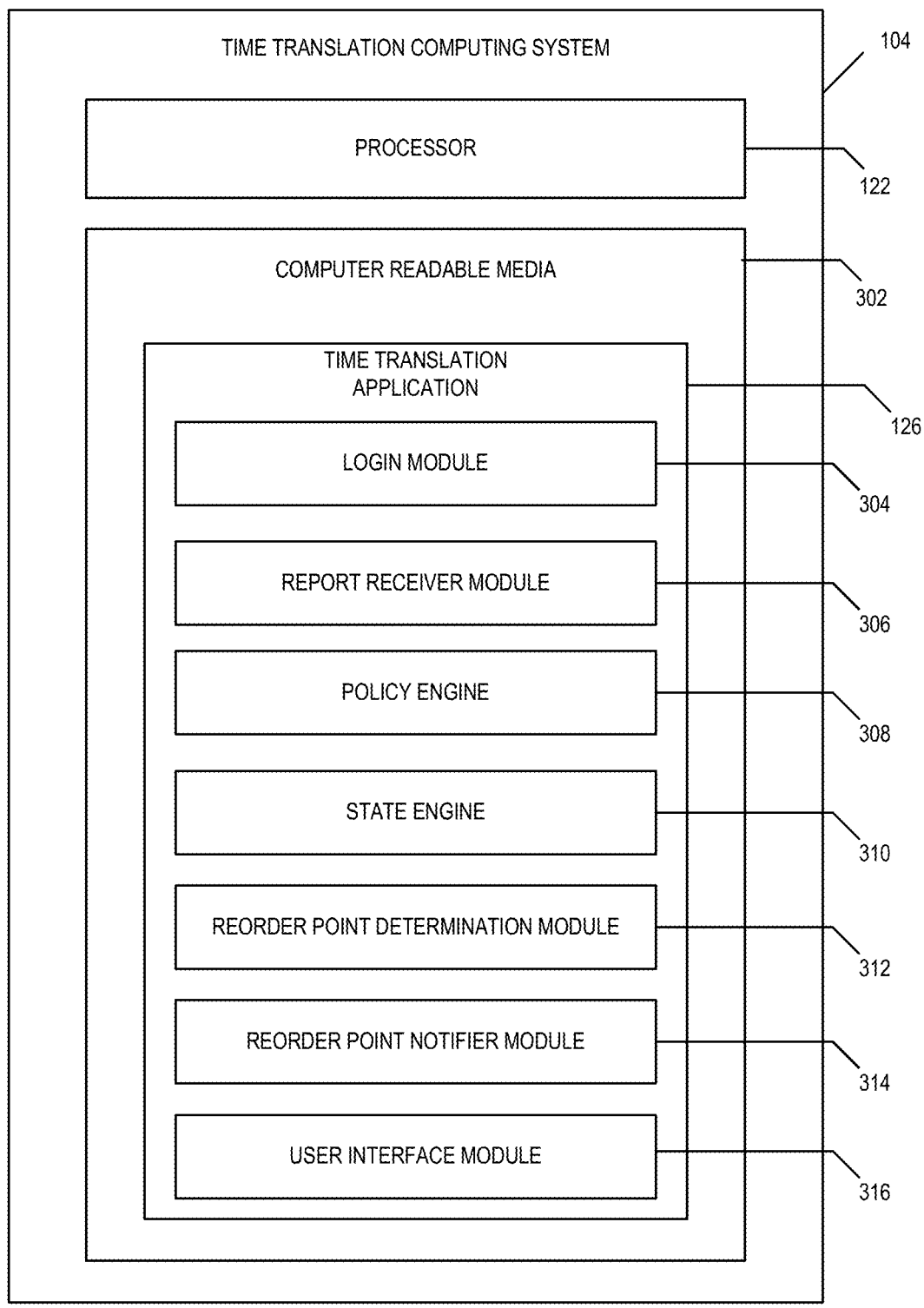
FIG. 3 illustrates a block diagram of an example time translation application executed by the system for determining when to order computing resources according to one embodiment of the present disclosure.

FIG. 3 illustrates a block diagram of the time translation application 126 of the time translation computing system 104 according to an example embodiment. The time translation computing system 104 includes computer readable media (CRM) 302 on which the time translation application 126 is stored. The computer readable media 302 may include volatile media, nonvolatile media, removable media, non-removable media, and/or another available medium that can be accessed by the processor 122. By way of example and not limitation, the computer readable media 302 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, for example.

The time translation application 126 includes a login module 304 that receives login information sent from the client computing device 102. The login module 304 may be in communication with a user interface module 316 (described below) that generates a user interface for receiving the login information from the client computing device 102. The login information may include a representation of a username and a password. The username and password may be encrypted by the client computing device 102 using transport layer security (TLS), secure sockets layer (SSL), and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the time translation computing system 104 or another computing system without directly sending the username and password to the time translation computing system 104 or another computing system via the communications network 114.

Figure 5A:
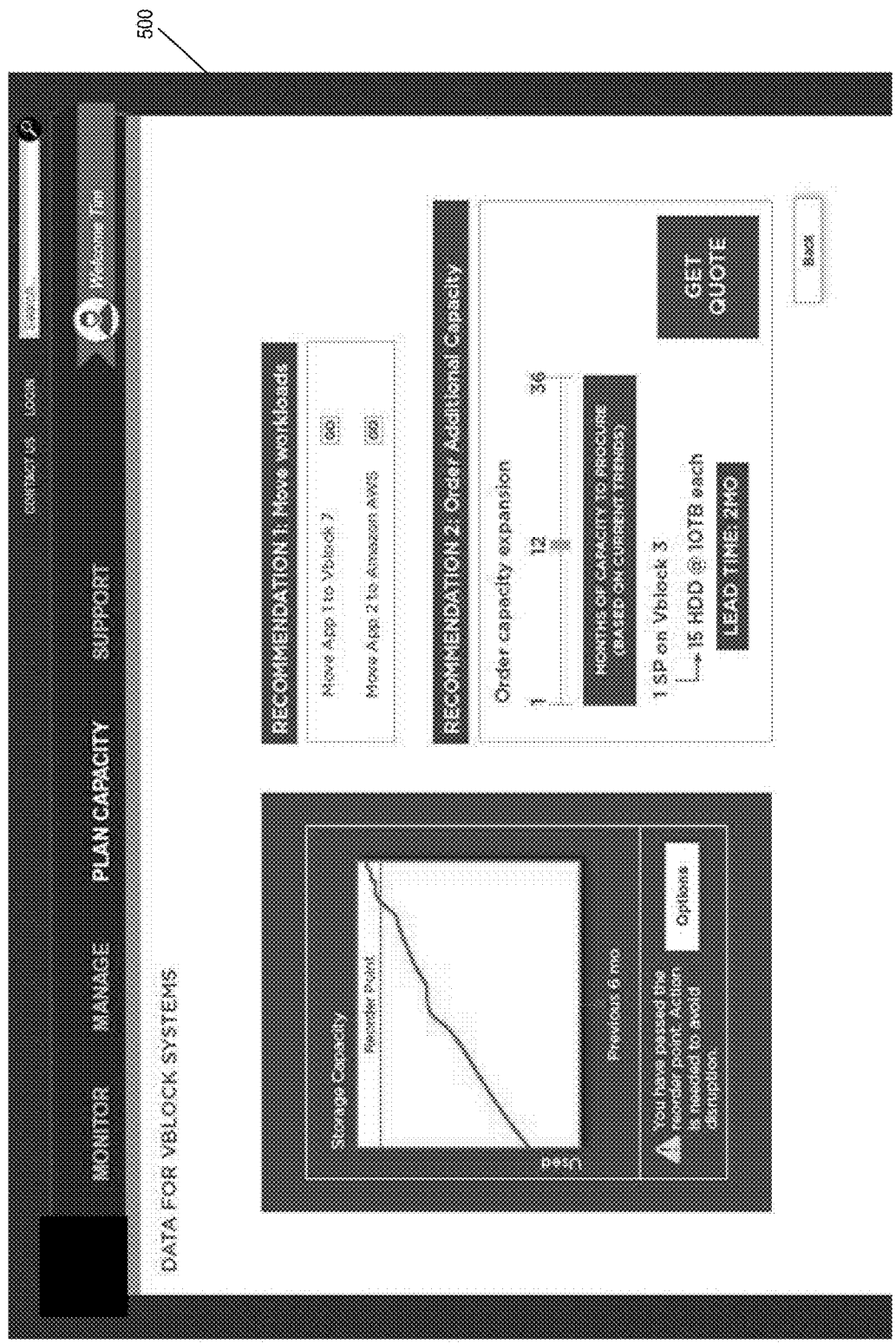
FIG. 5A illustrates a screenshot of a portal provided by the time translation application according to one embodiment of the present disclosure.

If the login information is not valid, the login module 304 transmits an error message to the client computing device 102. However, if the login information is valid, the login module 304 transmits a portal user interface to the client computing device 102. An example user interface is shown in FIG. 5A. As an example, the login module 304 transmits resources and user interface elements to generate a web page for planning computing resource capacity to the client computing device 102.

The time translation application 126 further includes a report receiver module 306 that regularly receives usage report information for the computing environment 108. When an order for the computing environment 108 is placed by the administrator, the computing environment 108 is assigned a unique order identifier for referencing the order, e.g., ABCD1234. The unique order identifier is stored in the data source 106 along with the order date and/or the order time for the order. By referencing the unique order identifier, the report receiver module 306 receives the usage report information from the data source 106.

As an example, at a particular interval of time, e.g., at the end of each business day, the report receiver module 306 receives the usage report for the computing environment 108 and stores information associated with the usage report in the data source 106. The usage report may be a report regarding usage of the computing environment 108 provided by VCE VISION™ or another software analytics package. As an example, the report receiver module 306 may receive analytics information from the external providers 110 and/or the internal providers via analytics API calls. The usage report may include a list of one or more objects of the computing environment 108, a current overall utilization percentage of the computing environment 108, a utilization percentage of each of the one or more objects of the computing environment 108, and a recommended utilization percentage of each of the one or more objects of the computing environment 108, among other information.

The time translation application 126 further includes a policy engine 308 that comprises a rules engine that leverages and enforces rules of consumption, configuration, instantiation, and provisioning for the computing environment 108. The rules may be related to role based access for users of the computing environment, the taxonomy or configuration of the computing environment, the availability of the computing environment, and the reliability of the computing environment. As an example, a policy may comprise one or more rules based on a goal of maintaining 99.999% (five nines) availability and reliability for the computing environment 108. This policy may be set by the administrator of the enterprise. As another example, a policy may comprise one or more rules to configure the computing environment with particular internal providers 112. As an even further example, a policy may comprise one or more rules to configure the computing environment with providers having a high rating. The rating may be provided by the administrator and/or the employees. These policies may be used to populate a bill of materials for an upgrade for the computing environment 108. As an example, although a software developer for the enterprise would prefer to order a single server, the availability policy or rule set by the administrator of the enterprise may only allow the software developer to order two servers that are geographically located a particular distance from one another. The rules may be based on a specified service level agreement (SLA) parameter or other factors. The policy engine 308 is used by the time translation application 126 to determine recommendations for upgrading or otherwise altering the computing environment 108. Policies provided by the policy engine 308 may be applied to each object currently comprising the computing environment 108 and objects to be ordered for the computing environment 108. The policy engine 308 may validate each object of the computing environment 108 by receiving a representation of the object according to the object model. Thus, the object model is validated against each rule of the policy engine 308.

The time translation application 126 further includes a state engine 310 that applies the various policies for the computing environment 108 while the computing environment 108 is in use. The state engine 310 is used to provide a quality of service related to security or performance while the computing environment 108 is in use. As an example, one of the policies may be related to security of the computing environment that provides the email system while in use. Another policy may be one or more rules related to increases in overall utilization of the computing environment 108 or utilization of one object of the computing environment. The state engine 310 receives realtime information and data from the report receiver module 306 and ensures that the computing environment meets the policy rules established by the policy engine 308.

The time translation application 126 includes a reorder point determination module 312 that aggregates data from the report receiver module 306, the object model, the policy engine 308, and the state engine 310, and determines the current components of the computing environment 108 and current utilization or consumption of each of the components of the computing environment 108. The reorder point determination module 312 determines recommendations to make based on the policies. The policy engine 308 may specify that certain computing components of the computing environment 108 may only be provided by internal providers 112. As another example, the state engine 310 may specify a maximum overall utilization for processor load of the computing environment 108.

The reorder point determination module 312 translates overall utilization of the computing environment 108 and each component of the computing environment 108 into units of time. For example, the overall utilization of the computing environment 108 may be currently increasing approximately 1% each week and may be accelerating at a particular rate. This increase may be within policies established and/or may not be within policies established. Based on the time that it may take to order additional computing components, the reorder point determination module 312 may determine a specific reorder point for placing an order for the additional computing components for the computing environment 108. As an example, the computing environment may include a storage array that is currently 80% used. The storage array usage may be currently growing at a constant rate of 1% per month. Ordering and building a new storage array and relocating the data from the old storage array to the new storage array may take approximately two months. If the recommended utilization for the storage array is 90%, then the reorder point determination module 312 determines a reorder point of eight months. The reorder point determination module 312 may recommend a reorder point of seven months from today to ensure that the additional storage capacity is ready just in time.

The reorder point determination module 312 receives a unique order identifier from the client computing device 102, e.g., ABCD1234, receives the usage report information from the report receiver module 306 and/or queries the data source 106 using the unique order identifier, and determines a current usage for the computing environment 108 based on the unique order identifier and usage report information that may be stored in the data source 106. The reorder point determination module 312 determines an estimated future usage for the computing environment based on past usage and an estimated growth in utilization. The reorder point determination module 312 determines reorder options based on the past usage and the estimated growth in utilization. As an example, if storage is consumed at an average historical rate of 1 GB a month and growing at a rate of 10%, then the projected resource consumption rate for the next month would be 1.1 GB. If storage consumption continues to grow at 10%, then the projected resource consumption rate for two months would be 1.1 GB+1.1 GB*110%=2.31 GB. The reorder point determination module 312 determines a recommended reorder point if the projected resource consumption rate is approaching the storage capacity. As an example, there may be 3 GB of available storage and the available storage will be consumed in the third month. The amount of time to order, configure, and provision 3 GB may be seven days. Taking into account an amount of time to order, configure, and provision additional storage, the reorder point determination module 312 determines a particular reorder point to provision additional storage before the storage is consumed in the third month and notifies the central IT user to order the additional storage at the particular order point. In one aspect, the recommended reorder point may be the last week of the second month.

The projected growth in utilization may be a minimum growth, a maximum growth, and a mean, median or average growth, among other options. The projected growth is obtained using the reports provided by the report receiver module 306. The projected growth in utilization may be determined based on a period of past (actual) usage that may be automatically determined and/or set by the central IT user. As an example, the central IT user may transmit a request that the projected growth be determined using the past six months of utilization and growth during this period using reports provided by the report receiver module 306 over the past six months, the past year of utilization and growth using reports provided by the report receiver module 306 over the past year, or another period of time of utilization and growth. The reorder point determination module 312 receives available stock information for additional computing resources from the external providers 110 and the internal providers 112 via the API calls, and provides one or more recommended reorder points and/or one or more recommended upgrades, one or more recommended modifications, and one or more recommended additional computing resources for the computing environment 108.

The recommended reorder point may be a specific date or time frame. The reorder point is determined by translating a utilization capacity of the computing environment 108 into a time bound construct. As an example, according to current usage and projected growth of utilization, the computing environment 108 may be outside of SLA within three months. Based on a lead time to build, provision, and deploy additional recommended resources, the reorder point determination module 312 determines a particular recommended reorder point. Cushion time or extra time may be included in the lead time to ensure that the additional recommended resources are ready. The cushion time or extra time may be minimized to reduce unnecessary expenditures. The time translation and determination of the recommended reorder point may be dynamic and may fluctuate based on a rate of consumption in addition to known or possible delays in fulfilling the order for additional recommended resources. The delay information may be received from the external providers 110 and the internal providers 112 and used to generate the cushion time or the extra time. Thus, according to an example embodiment, the central IT user may set a time-based threshold based on current and projected usage rather than based on a fixed utilization percentage and rules of thumb or tribal knowledge. This leads to the just in time provisioning of computing resources.

Time translation may be based on current and projected utilization that may be related to physical usage or consumption and utilization percentage or consumption. Time translation may be determined based on overall utilization and/or based on a weakest link utilization. In other words, a weakest link may be the computing resource or object that may have to be upgraded or modified the soonest. The weakest link may be determined based on current usage and projected usage.

As an example, each object of the computing environment 108 may have a physical usage and a utilization percentage. A server or another computing device may have one or more processors, e.g., central processing units (CPUs) and/or graphics processing units (GPUs), having a particular processor speed and/or a number of processing cores. Each processor may have a utilization percentage and may be shared by one or more applications of the enterprise. As an example, a particular CPU may have an average load or utilization of 25%.

The server or another computing device also may have a particular amount of random access memory (RAM). The RAM may have a utilization percentage and may be shared by the one or more applications of the enterprise. As an example, a particular block of RAM may be 25% used and 75% may be available and/or free. If the RAM is overutilized, the RAM may swap portions of the RAM into non-transitory storage resulting in thrashing and underperformance.

A networking device may have a physical number of ports, e.g., ten, and each port may have a utilization percentage, e.g., a ratio of current network traffic to the maximum amount of traffic that the port can handle provided by the policy engine 308 and the state engine 310. As an example, the utilization percentage may be 50%.

A storage device or a storage array may have a particular physical amount of storage space, e.g., fifteen terabytes, in addition to a utilization percentage. The storage device may include seven terabytes of stored information and thus is approximately 7/15 full. The storage device utilization percentage may be responsive to a maximum input/output operations per second (IOPS) and a percentage of maximum 1OPS provided by the policy engine 308 and the state engine 310.

In other words, each utilization metric for the computing environment 108 may be based on a performance metric associated with and specific to the object provided by the policy engine 308 and the state engine 310. The central IT user may plan upgrades, modifications, and orders for additional computing resources for each object of the computing environment 108.

The time translation may be performed based on a current computing environment 108 configuration and/or an optimized computing environment configuration. As an example, two ports of the networking device may each be utilized at a lower percentage than recommended. A first port may be utilized at 20% and a second port may be utilized at 40%, whereas each port has a recommended utilization of 70% that may be provided by a policy of the policy engine 308 and the state engine 310. The traffic traveling over both ports may be sent to a single port to optimize the networking device and free up a port. This would reflect an optimized computing environment configuration. The time translation may be based on the current non-optimized configuration and/or an optimized configuration not currently being used.

As an example, a list of objects comprising a VBLOCK system may include computing components as shown below. As shown in the table below, the recommended reorder point may be one month for the entire computing environment, which has passed. The reorder point determination module 312 will likely recommend immediate reordering of upgrades for at least the second networking device, the first storage array, and the second storage array. The recommended reorder point for the second networking device may be two months, the recommended reorder point for the first storage array may be one month, and the recommended reorder point for the second storage array may be two months. In this case, each of these recommended reorder points have passed. In addition, the recommended reorder point for the first GPU may be four months. The reorder point determination module 312 recommends that each of these objects be upgraded. The reorder point determination module 312 receives available stock information for upgrades, modifications, and additional computing resources from the external providers 110 and the internal providers 112, and determines a recommended upgrade for the second networking device, the first storage array, the second storage array and the first GPU. Based on the current growth rate, the upgrade of the second networking device appears to be the most urgent upgrade. However, it may be possible to optimize the objects by utilizing ports of the first networking device instead of the second networking device.

| Object | Percentage Utilization | Recommended Utilization | Growth Rate (Per Month) | Outside SLA | Recommended Reorder Point |
|---|---|---|---|---|---|
| First CPU (Four Cores) | 50% | 70% | 5% | NO | 3 months |
| Second CPU (Eight Cores) | 40% | 70% | 3% | NO | 3 months |
| First GPU | 80% | 85% | 1% | NO | 4 months |
| First Networking Device | 25% | 80% | 10% | NO | 2 months |
| Second Networking Device | 90% | 80% | 5% | YES | 2 months, passed |
| First Storage Array | 90% | 70% | 0.5% | YES | 1 month, passed |
| Second Storage Array | 95% | 70% | 0.5% | YES | 1 month, passed |

In an additional embodiment, the central IT user may order upgrades, modifications, and additional computing resources to keep the computing environment 108 running at a particular utilization percentage, level utilization percentage, steady utilization percentage, or a certain utilization growth over a period of time. The reorder point determination module 312 may recommend upgrades, modifications, and additional computing resources for a particular period of time. As an example, the central IT user may order six months of future usage based on the past usage and projected usage as determined by the reorder point determination module 312. The reorder point determination module 312 may receive the order and deploy the upgrades, modifications, and additional computing resources to keep the computing environment running at the particular utilization percentage for the next six months. At a future time, the reorder point determination module 312 may remind the central IT user that the six months is coming to an end and that the central IT user may order recommended upgrades, modifications, and additional computing resources. In one example, if completion and deployment takes approximately three months, then the central IT user may be reminded at the mid-point of the six months. In some instances, if the usage changes over the six months, the reorder point determination module 312 may remind the central IT user earlier or later. As an example, if the usage grows, the reorder point determination module 312 may remind the central IT user at two months of the six months. If the usage shrinks or lessens, the reorder point determination module 312 may remind the central IT user at four months of the six months. In other words, the reorder point determination module 312 recommends upgrades, modifications, and additional computing resources to keep the computing environment 108 and/or the objects of the computing environment operating within a service level agreement (SLA) for a particular period of time.

The time translation application 126 further includes a reorder point notifier module 314 that transmits a message including the determined recommended reorder point and the recommended upgrade, modification, or additional computing resources to the client computing device 102. The message may be sent when a request for planning computing capacity is received from the client computing device 102. The message also may be pushed to the client computing device 102.

The central IT user may receive the message and may schedule a future order of the recommended upgrade, modification, or additional computing resources and/or may request that the reorder point notifier automatically remind the central IT user at the recommended reorder point, e.g., two months, to place the order. As an example, the reminder may be sent via email, push notification, or using another type of reminder.

As an example, the reorder point determination module 312 receives the unique order identifier from the client computing device 102, queries the data source 106 for report usage information associated with the computing environment 108 identified by the unique order identifier, and determines a current usage for the computing environment 108 based on the unique order identifier and usage report information that may be stored in the data source 106. The reorder point determination module 312 determines an estimated future usage for the computing environment based on past usage and an estimated growth in utilization, and receives available stock and availability information for additional computing resources from the external providers 110 and the internal providers 112. The reorder point determination module 312 determines one or more recommended reorder points and one or more recommended upgrades, modifications, and/or additional computing resources for the computing environment 108 and forwards the one or more recommended reorder points and the one or more recommended upgrades, modifications, and/or additional computing resources to the reorder point notifier module 314. The reorder point notifier module 314 transmits a message to the client computing device 102 indicating the one or more recommended reorder points and the one or more recommended upgrades, modifications, and/or additional computing resources for the computing environment 108. The client computing device 102 may receive the message from the reorder point notifier module 314 and display a graph that indicates past usage, projects future usage, indicates one or more reorder points, and provides user interface elements for obtaining the recommended upgrades, modifications, and/or additional computing resources via the web browser 120. The central IT user may view different projected future usage by changing a variable associated with estimated future usage. As an example, the future usage may be projected as minimal growth, average growth, maximum growth, and other types of future usage. The user interface elements may reference uniform resource locators (URLs) for obtaining, pre-ordering, or snoozing the recommended upgrades, modifications, or additional computing resources and reminding the central IT user of a reorder point in the future just in time to provision and use the recommended upgrades, modifications, and/or additional computing resources.

In additional embodiments, the reorder point notifier 314 may push updates that may have the one or more recommended reorder points and/or information regarding the one or more recommended upgrades, modifications, and/or additional computing resources to the client computing device 102. As an example, the client computing device 102 may request that regular updates be provided once a week, every other week, at another time interval, and/or when a certain event occurs, e.g., a reorder point is coming soon. Push updates may be scheduled by the central IT user using the client computing device 102 or another computing device using the portal. The reorder point notifier 314 may send the one or more recommended reorder points and/or information regarding the recommended upgrades, modifications, and/or additional computing resources to the client computing device 102. As an example, the reorder point notifier 314 may send this information to an email address associated with the central IT user or another email address. The email may include a uniform resource locator (URL) that when selected directs the central IT user to the portal to display the graph that indicates past usage, projects future usage, indicates one or more reorder points, and provides user interface elements for obtaining, preordering, or snoozing the recommended upgrades, modifications, and/or additional computing resources via the web browser 120. The graph may indicate overall utilization or utilization of a particular object with respect to time. For example, FIG. 5A shows a graph of utilization of storage capacity with respect to time and a particular reorder point that has passed.

Additionally, the time translation application 126 includes a user interface module 316 that generates a user interface of the time translation application 126. The user interface module 316 may generate a native and/or web-based graphical user interface (GUI) that accepts input and provides output. The user interface module 316 may send data to other modules of the time translation application 126 and receive data from other modules of the time translation application 126. As an example, the user interface module 316 transmits data and resources to the client computing device 102 and visually generates the user interface shown in FIG. 5A.

It should be appreciated that the modules described herein are provided only as examples, and that the time translation application 126 may have different modules, additional modules, or fewer modules than those described herein. For example, one or more modules as described in FIG. 3 may be combined into a single module. As another example, certain modules described herein may be encoded on, and executed on other computing systems, such as on one of the hosts 202 of a converged infrastructure 200 as described above with reference to FIGS. 2A and 2B.

Figure 4:
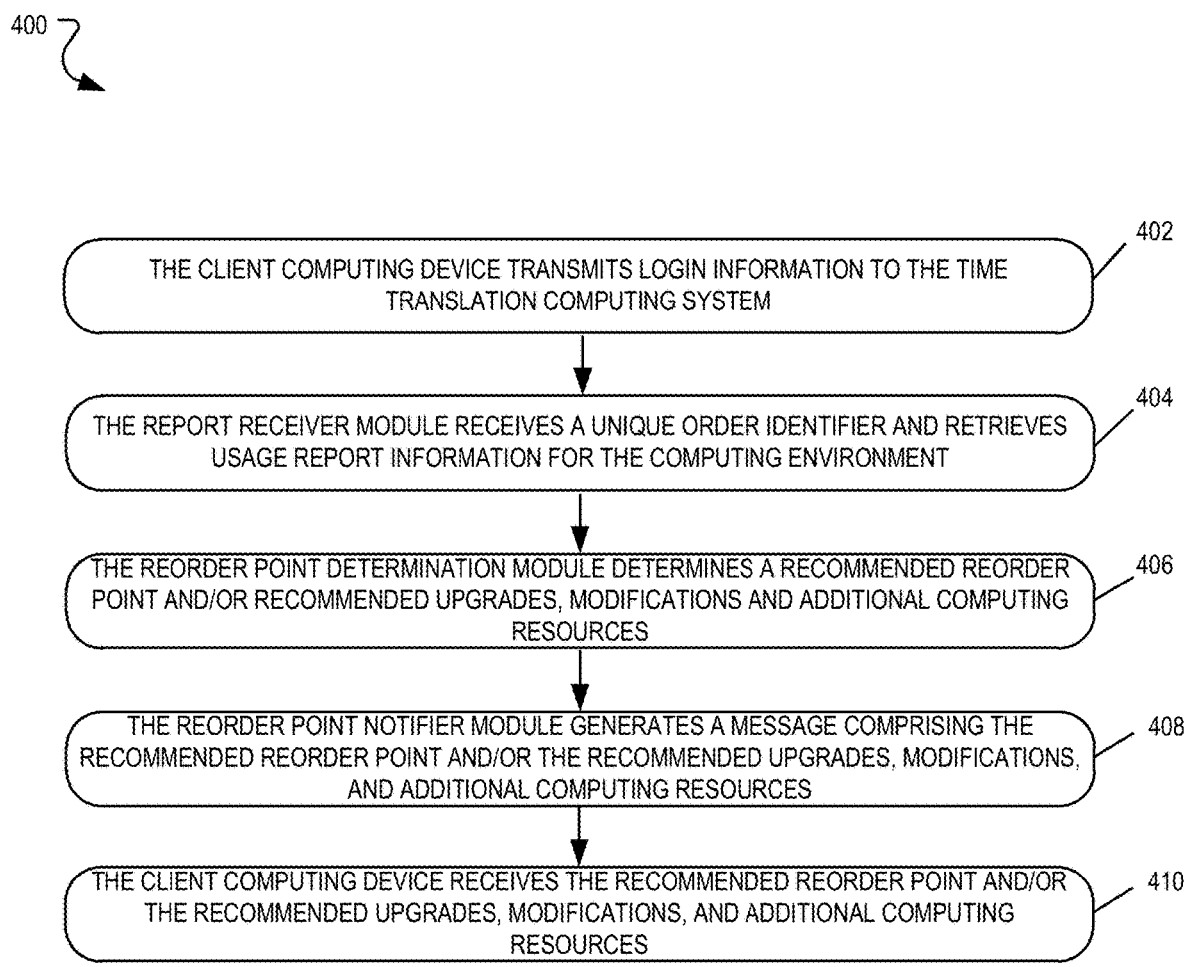
FIG. 4 illustrates an example process performed by the time translation application according to one embodiment of the present disclosure.

FIG. 4 illustrates a flowchart of a process 400 for determining when to order upgrades, modifications, and/or additional computing resources for the computing environment 108 according to an example embodiment. The process 400 shown in FIG. 4 begins in step 402. In step 402, the client computing device 102 transmits login information to the login module 304 of the time translation application 126 of the time translation computing system 104. The login information may include username information and password information, among other information. The login module 304 verifies that the login information is valid. If the login information is not valid, the login module 304 transmits an error message to the client computing device 102. If the login information is valid, the login module transmits resources and user interface elements to generate a web page to the client computing device 102, e.g., the portal shown in FIG. 5A.

In step 404, the report receiver module 306 receives a unique order identifier and retrieves usage report information for the computing environment 108 from the data source 106. The report receiver module 306 may retrieve the usage report information for the computing environment before the login information is received and/or after the login information is received from the client computing device 102. The usage report information may be viewed within the context of the object model used by the policy engine 308 and the state model used by the state engine 310.

In step 406, the reorder point determination module 312 determines a current usage for the computing environment 108 based on the unique order identifier and usage report information that may be stored in the data source 106 and determines an estimated future usage for the computing environment based on past usage and an estimated growth in utilization (minimum, average, maximum). The reorder point determination module 312 determines one or more recommended reorder points based on the estimated growth. The estimated growth in utilization may be partially determined based on central IT user input. As an example, the central IT user may select minimum, average, or maximum and the reorder point determination module 312 may modify its determination. The reorder point determination module 312 receives stock information and availability information for upgrades, modifications, and/or additional computing resources from the external providers 110 and the internal providers 112 via API calls based on the estimated growth. The reorder point determination module 312 determines one or more recommended upgrades, modifications, and/or additional computing resources for the computing environment 108.

In step 408, the reorder point notifier module 314 of the time translation application 126 of the time translation computing system 104 generates a message comprising at least the recommended reorder point and/or the recommended upgrades, modifications, and/or additional computing resources to the client computing device 102. The message may be sent in response to a request from the client computing device 102 and/or may be pushed to the client computing device 102.

In step 410, the web browser 120 of the client computing device 102 receives the one or more recommended reorder points and/or the one or more recommended additional computing resources from the time translation application 126 of the time translation computing system 104 and generates a web page showing a representation of the one or more recommended reorder points and the recommended one or more upgrades, modifications, and/or additional computing resources. In one example, the web page shows the one or more recommended reorder points and information associated with the recommended upgrades, modifications, and/or additional computing resources, e.g., Recommended Reorder Point: 2 months for additional storage capacity. In this situation, if the additional storage capacity is ordered two months from the current date, it will be deployed just in time for use. For the recommended upgrades, modifications, and/or additional computing resources, the web page may show user interface elements that when selected by the input device of the client computing device 102, direct the web browser 120 to URLs for obtaining, ordering, and/or receiving a quote for the recommended upgrades, modifications, and/or additional computing resources.

Although FIG. 4 describes one example of a process that may be performed by the time translation application 104 to determine one or more recommended reorder points and/or one or more recommended upgrades, modifications, and/or additional computing resources, the features of the disclosed process may be embodied in other specific forms without deviating from the spirit and scope of the present disclosure. For example, the time translation application 104 may perform additional, fewer, or different operations than those operations as described in the present example. As another example, the steps of the process described herein may be performed by a computing system other than the time translation computing system 104, which may be, for example, one of the virtual objects executed on the virtual computing environment.

FIG. 5A shows an example screenshot 500 of a user interface of the time translation application 126 displayed by the web browser 120 of the client computing device 102 according to an example embodiment. As shown in FIG. 5A, the portal includes a Monitor tab, a Manage tab, a Plan Capacity tab (currently shown), and a Support tab. As shown in FIG. 5A, a graph is shown that indicates used storage capacity of the computing environment 108 over a period of time, shows the growth of the utilization, and indicates that the recommended reorder point has passed. In addition, FIG. 5A shows two different recommendations for additional computing resources. FIG. 5A shows a first recommendation to move workloads for applications. An App 1 may be moved to VBLOCK 7 and App 2 may be moved to Amazon AWS by selecting the corresponding "Go" button that directs the user, e.g., the central IT user to URL for moving the workload. A second recommendation includes ordering additional storage capacity. As shown, the time translation application 126 recommends procuring twelve months of capacity based on current usage trends. There is a lead time of two months for the second recommendation, thus, the recommended reorder point is at least two months before use. In addition, the second recommendation includes a user interface element for obtaining a quote for the additional capacity.

Figure 5B:
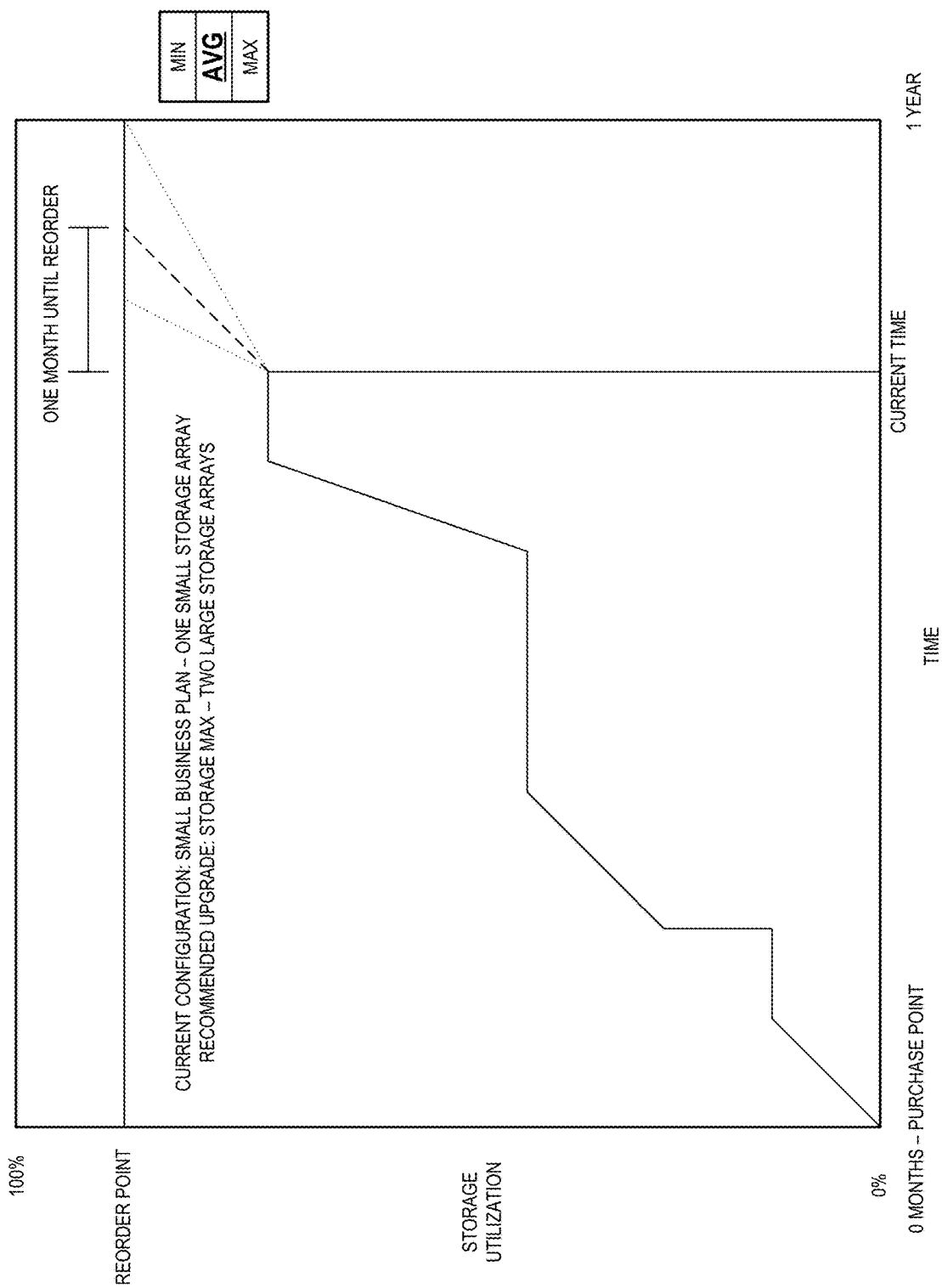
FIG. 5B illustrates an example graph showing a recommended reorder point according to one embodiment of the present disclosure.

FIG. 5B illustrates an example graph showing a recommended reorder point determined by the system 100 according to one embodiment of the present disclosure. As shown in FIG. 5B, the central IT user ordered the small business storage utilization plan that includes one small storage array. The graph shows the storage utilization of the one small storage array with respect to time and indicates the current point in time. The central IT user has selected average growth to project future storage utilization. However, minimum growth and maximum growth are also shown. As illustrated in FIG. 5B, the recommended reorder point is one month. In addition, the system 100 has determined a recommended upgrade. The system 100 recommends that the central IT user upgrade to the storage max plan that includes two large storage arrays. The recommended reorder point and/or the recommended upgrades, modifications, and/or additional computing resources are based on the projected future growth. Thus, if the central IT user changes the projected future growth to minimum or maximum, the recommended reorder point and/or the recommended upgrades, modifications, and/or additional computing resources may change.

Figure 5C:
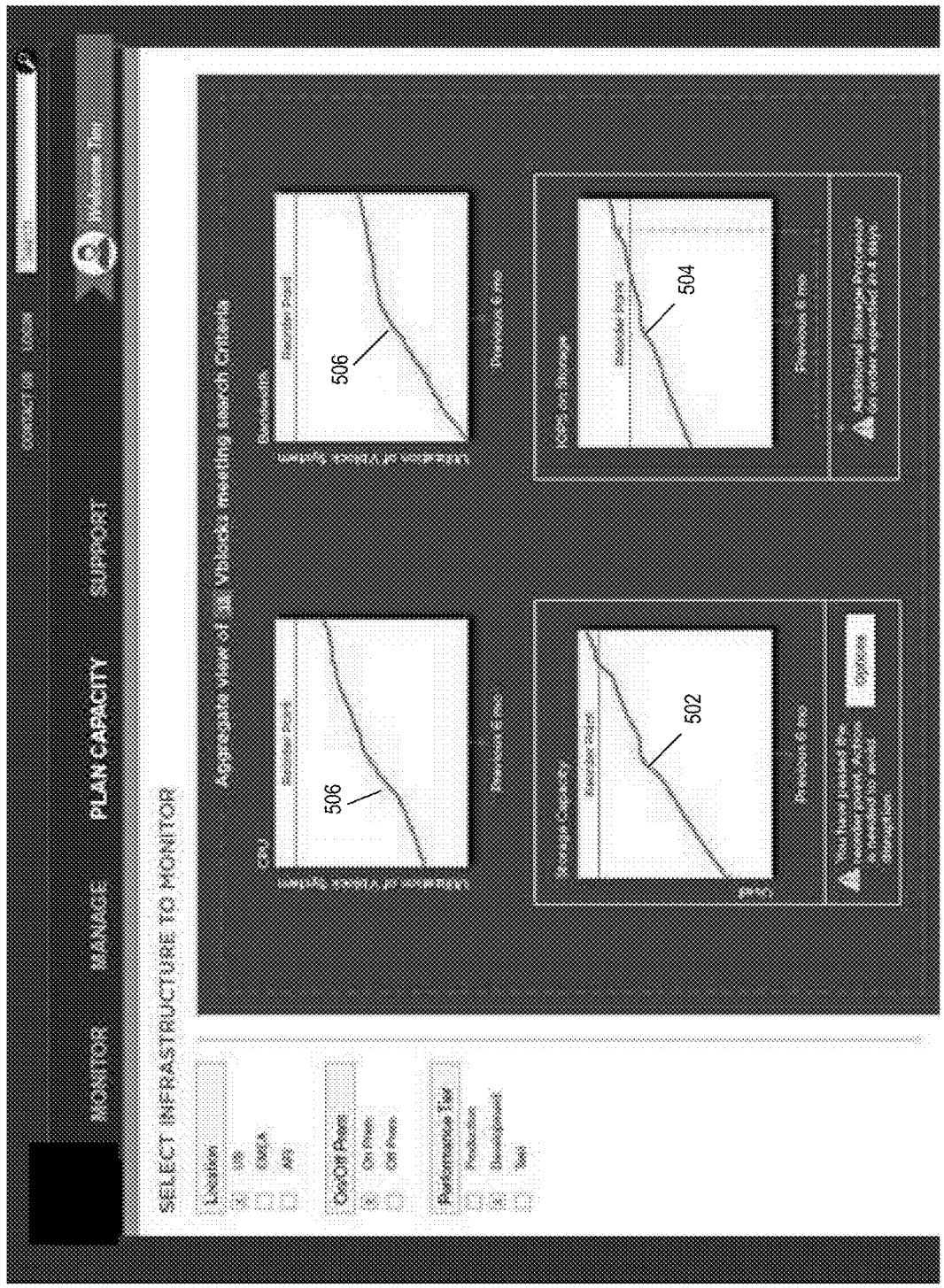
FIG. 5C illustrates an additional example screenshot of the portal provided by the time translation application according to one embodiment of the present disclosure.

FIG. 5C illustrates an additional example screenshot of a user interface of the time translation application 126 displayed by the web browser 120 of the client computing device 102 according to an example embodiment. This user interface shows four different graphs associated with 15 Vblocks of the computing environment 108 that meet search criteria. As shown in graph 502, additional resources may be required and a storage pool of resources may have exceeded/passed a reorder point. The consumers of this storage pool have written to disk in the storage pool at a consistent and growing rate over the last six months. The graph 502 shows historical capacity utilization and current capacity utilization for storage consumption. Future capacity utilization may be based on the acceleration of capacity utilization over a period of time. The central IT user may be notified when the reorder point is approaching. In this case, the central IT user did not order before the reorder point and action may be needed to avoid disruption.

As shown in graph 504, additional resources may be required. However, in this case, the additional resources have been ordered and a projected time to receipt is shown, e.g., four days. In the meantime, if a spike in consumption occurs, the central IT user may take other remedial action, described below. Graph 504 shows projected resource consumption for 10PS on storage.

As shown in graph 506, additional resources may not be immediately necessary, but they may be in the near future. As shown in graph 506, both CPU usage and network bandwidth are being monitored. Both CPU usage and network bandwidth continue on upward usage trends. However, reorder points have not been reached. A recommended reorder point may be determined based on utilization/consumption and a time to provision resources. As an example, one or more virtual machines currently consume a single CPU. The current growth trend indicates that the one or more virtual machines may consume an additional CPU each month. If there are two remaining CPUs associated with the computing environment 108, then the reorder point may be 60 days. At the recommended reorder point, e.g., 60 days prior to consumption of the CPUs, the central IT user may be sent a notification to reorder additional CPU resources and/or rebalance the load by using other resources that are not nearing a reorder point.

In another aspect, the central IT user may choose to take remedial options other than reordering. As an example, the system 100 may recommend that the central IT user rebalance workloads performed by the computing environment 108. This may include rebalancing workloads or applications using the computing environment 108 by assigning them to pools of resources that are not nearing total consumption of resources and/or not nearing a reorder point.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
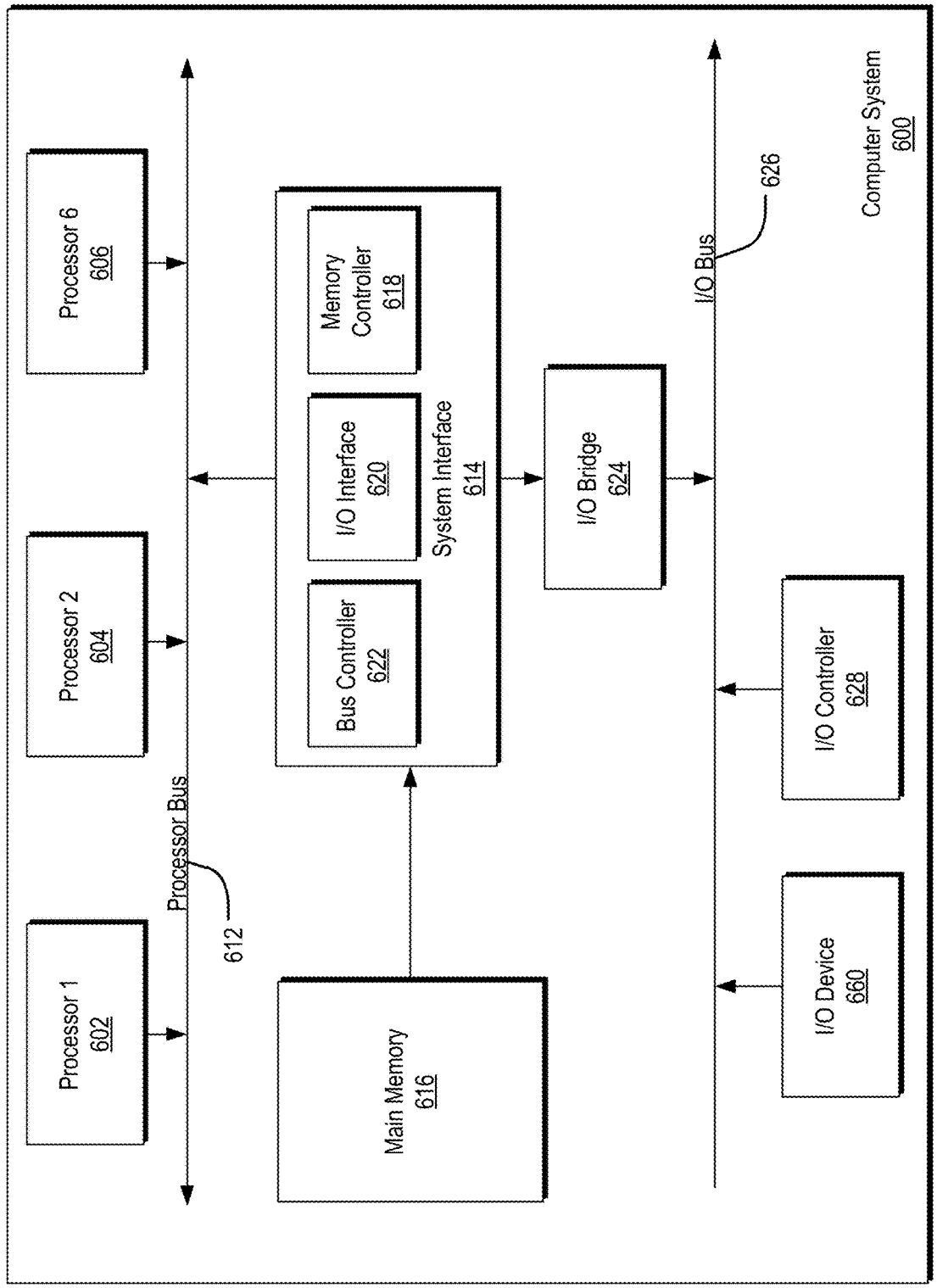
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. In addition, system interface 614 may be connected to an I/O bridge 624 to interface other components of the system 600 over an I/O bus 626. For example, system interface 614 may include a memory controller 618 for interfacing a main memory 616 with the processor bus 612. The system interface 614 also may include a bus controller 622 that controls the processor bus 612 and the I/O bus 626. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 660, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
   at least one processor to:
   receive a request to determine when to order computing resources for a virtual computing environment comprising at least one virtual computing object that is dynamically configurable, the request associated with a unique order identifier;
   receive at least one usage report for the virtual computing environment, the at least one usage report detailing past usage of the at least one virtual computing object included in the virtual computing environment over a period of time, the at least one virtual computing object comprising at least one of a central processing unit, a graphics processing unit, a storage device, a random access memory, a networking device, a software application, a firewall, a load balancer, a hypervisor, and a virtualization management system;
   compute future usage of the at least one virtual computing object included in the virtual computing environment based on estimated growth of utilization of at least one of compute, network, storage, and virtualization resources of the at least one virtual computing object included in the virtual computing environment using data in the at least one usage report that indicates a continuous and real-time perspective of the compute, network, storage, and virtualization resources of the at least one virtual computing object included in the virtual computing environment;

determine at least one recommended reorder point for an upgrade to the at least one virtual computing object included in the virtual computing environment comprising a future date and at least one recommended upgrade for the virtual computing environment that is a weakest link to be upgraded or modified the soonest based on the past usage, the future usage, and a time to complete and deploy the at least one recommended upgrade to the virtual computing environment;

generate a graphical user interface representation of the at least one recommended reorder point with respect to time on a graph indicating the future date and an amount of time until the future date, the at least one recommended reorder point, the future date, and the amount of time until the future date changing on the graph in response to projected future growth input by a user selection comprising one of minimum future growth, average future growth, and maximum future growth;

generate a graphical user interface representation of the at least one recommended upgrade; and receive a selection of the at least one recommended upgrade for the virtual computing environment that provisions and makes the at least one recommended upgrade to the virtual computing environment and dynamically reconfigures the at least one virtual computing object.

2. The system of claim 1, wherein the estimated growth of utilization comprises one of minimum growth based on past usage over a particular period of time, average growth based on past usage over the particular period of time, and maximum growth based on past usage over the particular period of time.

3. The system of claim 1, wherein the at least one recommended upgrade comprises at least one of an upgrade, a modification, and additional computing resources for the at least one virtual computing object of the virtual computing environment, the at least one processor further to:

receive an order for the at least one recommended upgrade, the order comprising a particular period of time of operation within a service level agreement (SLA) for the virtual computing environment.

4. The system of claim 1, the at least one processor further to:

receive a request to send a reminder at a later time to place an order for the at least one recommended upgrade before the future date and have the at least one recommended upgrade deployed just in time for use.

5. The system of claim 4, wherein the reminder is sent via one of email and push notification.

6. The system of claim 1, the at least one processor further to:

determine the at least one recommended reorder point and the at least one recommended upgrade based on a service level agreement (SLA) for the virtual computing environment.

7. The system of claim 1, the at least one processor further to:

receive a request to upgrade the virtual computing environment, the virtual computing environment comprising a converged infrastructure;

assign the request to upgrade the unique order identifier;

store the unique order identifier in a data source along with an order time;

determine stock information and availability information for resources of the converged infrastructure from external providers and internal providers;

determine a period of time to complete the at least one recommended upgrade and have the at least one recommended upgrade deployed just in time for use using the stock information and the availability information; and determine the at least one recommended reorder point using the period of time to complete the at least one recommended upgrade and have the at least one recommended upgrade deployed just in time for use.

8. A method, comprising:

receiving, by at least one processor, a request to determine when to order computing resources for a virtual computing environment comprising at least one virtual computing object that is dynamically configurable, the request associated with a unique order identifier;

receiving, by the at least one processor, at least one usage report for the virtual computing environment, the at least one usage report detailing past usage of the at least one virtual computing object included in the virtual computing environment over a period of time, the at least one virtual computing object comprising a central processing unit, a graphics processing unit, a storage device, a random access memory, a networking device, a software application, a firewall, a load balancer, a hypervisor, and a virtualization management system;

computing, by the at least one processor, future usage of the at least one virtual computing object included in the virtual computing environment based on estimated growth of utilization of at least one of compute, network, storage, and virtualization resources, the at least one virtual computing object included in the virtual computing environment using data in the at least one usage report that indicates a continuous and real-time perspective of the compute, network, storage, and virtualization resources of the at least one virtual computing object included in the virtual computing environment;

determining, by the at least one processor, at least one recommended reorder point for an upgrade to the at least one virtual computing object included in the virtual computing environment comprising a future date and at least one recommended upgrade for the virtual computing environment that is a weakest link to be upgraded or modified the soonest based on the past usage, the future usage, and a time to complete and deploy the at least one recommended upgrade to the virtual computing environment;

generating, by the at least one processor, a graphical user interface representation of the at least one recommended reorder point with respect to time on a graph indicating the future date and an amount of time until the future date, the at least one recommended reorder point, the future date, and the amount of time until the future date changing on the graph in response to projected future growth input by a user selection comprising one of minimum future growth, average future growth, and maximum future growth;

generating, by the at least one processor, a graphical user interface representation of the at least one recommended upgrade; and receiving, by the at least one processor, a selection of the at least one recommended upgrade for the virtual computing environment that provisions and makes the at least one recommended upgrade to the virtual computing environment and dynamically reconfigures the at least one virtual computing object.

9. The method of claim 8, further comprising computing the future usage, the estimated growth of utilization comprising one of minimum growth based on past usage over a particular period of time, average growth based on past usage over the particular period of time, and maximum growth based on past usage over the particular period of time.

10. The method of claim 8, further comprising:
determining the at least one recommended upgrade, the at least one recommended upgrade comprising at least one of an upgrade, a modification, and additional computing resources for the at least one virtual computing object of the virtual computing environment; and receiving an order for the at least one recommended upgrade, the order comprising a particular period of time of operation within a service level agreement (SLA) for the virtual computing environment.

11. The method of claim 8, further comprising receiving a request to send a reminder at a later time to place an order for the at least one recommended upgrade before the future date and have the at least one recommended upgrade deployed just in time for use.

12. The method of claim 11, further comprising sending the reminder via one of email and push notification.

13. The method of claim 8, further comprising determining the at least one recommended reorder point and the at least one recommended upgrade based on a service level agreement (SLA) for the virtual computing environment.

14. The method of claim 8, further comprising:
receiving a request to upgrade the virtual computing environment, the virtual computing environment comprising a converged infrastructure;

assigning the request to upgrade the unique order identifier;

storing the unique order identifier in a data source along with an order time;

determining stock information and availability information for resources of the converged infrastructure from external providers and internal providers;

determining a period of time to complete the at least one recommended upgrade and have the at least one recommended upgrade deployed just in time for use using the stock information and the availability information; and determining the at least one recommended reorder point using the period of time to complete the at least one recommended upgrade and have the at least one recommended upgrade deployed just in time for use.

15. A non-transitory computer-readable medium having instructions stored thereon that, when executed by at least one processor, cause the at least one processor to perform operations comprising:

receiving a request to determine when to order computing resources for a virtual computing environment comprising at least one virtual computing object that is dynamically configurable, the request associated with a unique order identifier;

receiving at least one usage report for the virtual computing environment, the at least one usage report detailing past usage of the at least one virtual computing object included in the virtual computing environment over a period of time, the at least one virtual computing object comprising a central processing unit, a graphics processing unit, a storage device, a random access memory, a networking device, a software application, a firewall, a load balancer, a hypervisor, and a virtualization management system;

computing future usage of the at least one virtual computing object included in the virtual computing environment based on estimated growth of utilization of at least one of compute, network, storage, and virtualization resources of the at least one virtual computing object included in the virtual computing environment using data in the at least one usage report that indicates a continuous and real-time perspective of the compute, network, storage, and virtualization resources of the at least one virtual computing object included in the virtual computing environment;

determining at least one recommended reorder point for an upgrade to the at least one virtual computing object included in the virtual computing environment comprising a future date and at least one recommended upgrade for the virtual computing environment that is a weakest link to be upgraded or modified the soonest based on the past usage, the future usage, and a time to complete and deploy the at least one recommended upgrade to the virtual computing environment;

generating a graphical user interface representation of the at least one recommended reorder point with respect to time on a graph indicating the future date and an amount of time until the future date, the at least one recommended reorder point, the future date, and the amount of time until the future date changing on the graph in response to projected future growth input by a user selection comprising one of minimum future growth, average future growth, and maximum future growth;

generating a graphical user interface representation of the at least one recommended upgrade; and receiving a selection of the at least one recommended upgrade for the virtual computing environment that provisions and makes the at least one recommended upgrade to the virtual computing environment and dynamically reconfigures the at least one virtual computing object.

16. The non-transitory computer-readable medium of claim 15, the operations further comprising computing the future usage, the estimated growth of utilization comprising one of minimum growth based on past usage over a particular period of time, average growth based on past usage over the particular period of time, and maximum growth based on past usage over the particular period of time.

17. The non-transitory computer-readable medium of claim 15, the operations further comprising:
determining the at least one recommended upgrade, the at least one recommended upgrade comprising at least one of an upgrade, a modification, and additional computing resources for the at least one virtual computing object of the virtual computing environment; and receiving an order for the at least one recommended upgrade, the order comprising a particular period of time of operation within a service level agreement (SLA) for the virtual computing environment.

18. The non-transitory computer-readable medium of claim 15, the operations further comprising receiving a request to send a reminder at a later time to place an order for the at least one recommended upgrade before the future date and have the at least one recommended upgrade deployed just in time for use.

19. The non-transitory computer-readable medium of claim 18, the operations further comprising sending the reminder via one of email and push notification.

20. The non-transitory computer-readable medium of claim 15, the operations further comprising determining the at least one recommended reorder point and the at least one recommended upgrade based on a service level agreement (SLA) for the virtual computing environment.

* * * * *